J. A. KENNEDY-McGREGOR.
DISPLAY APPARATUS.
APPLICATION FILED MAY 12, 1913. RENEWED FEB. 29, 1916.
1,179,531.
Patented Apr. 18, 1916.
3 SHEETS—SHEET 1.
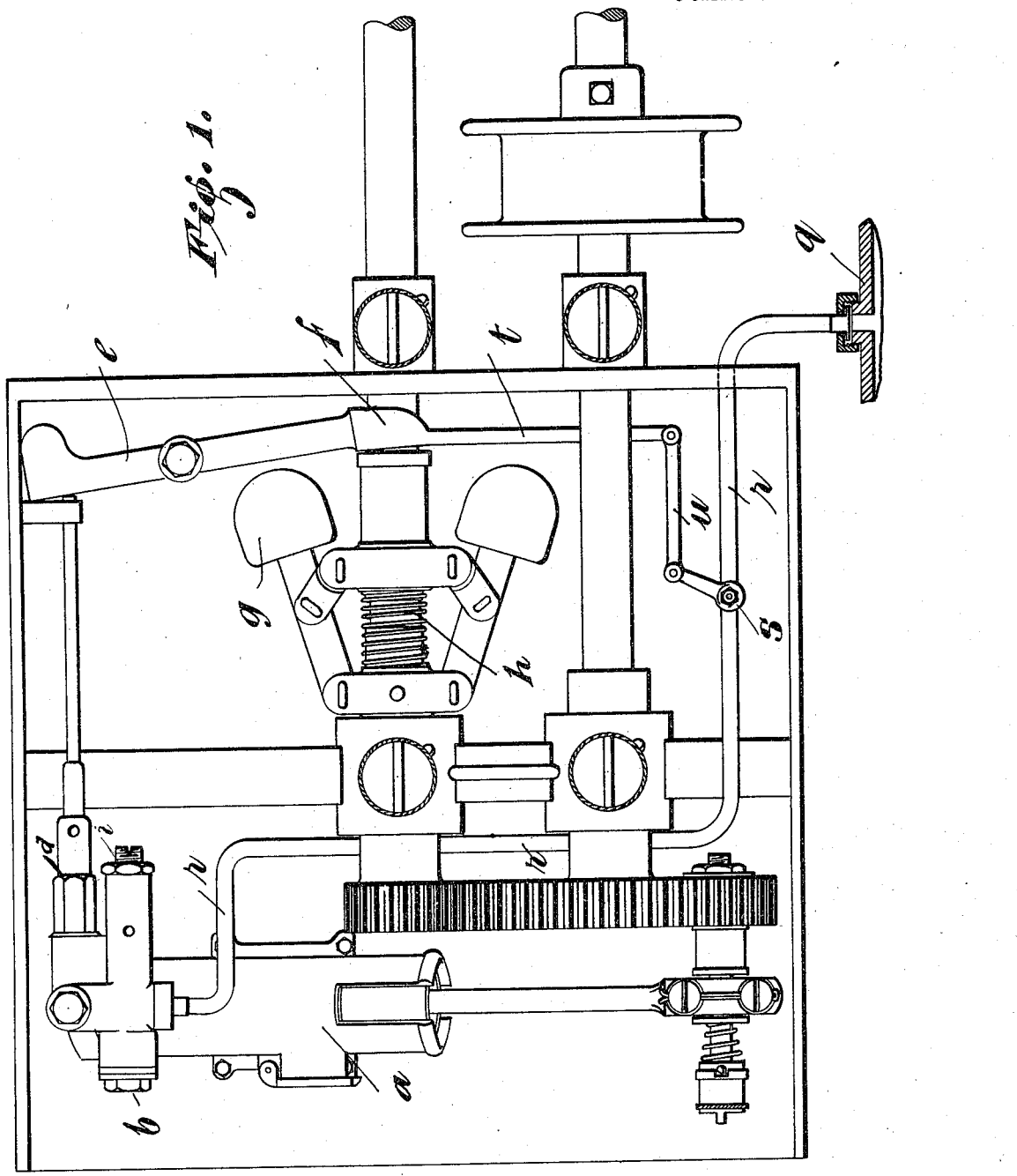

J. A. KENNEDY-McGREGOR.
DISPLAY APPARATUS.
APPLICATION FILED MAY 12, 1913. RENEWED FEB. 29, 1916.
1,179,531.
Patented Apr. 18, 1916.
3 SHEETS—SHEET 2.
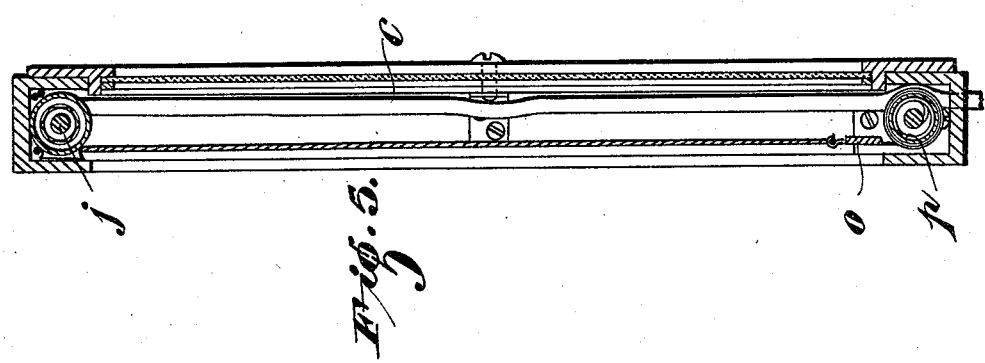
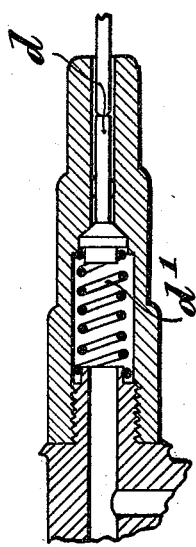
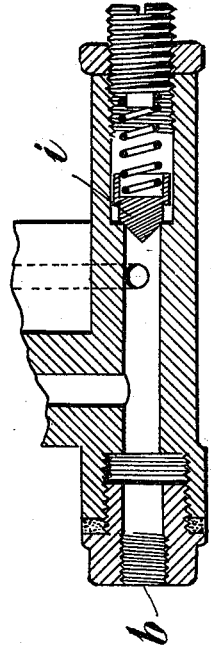

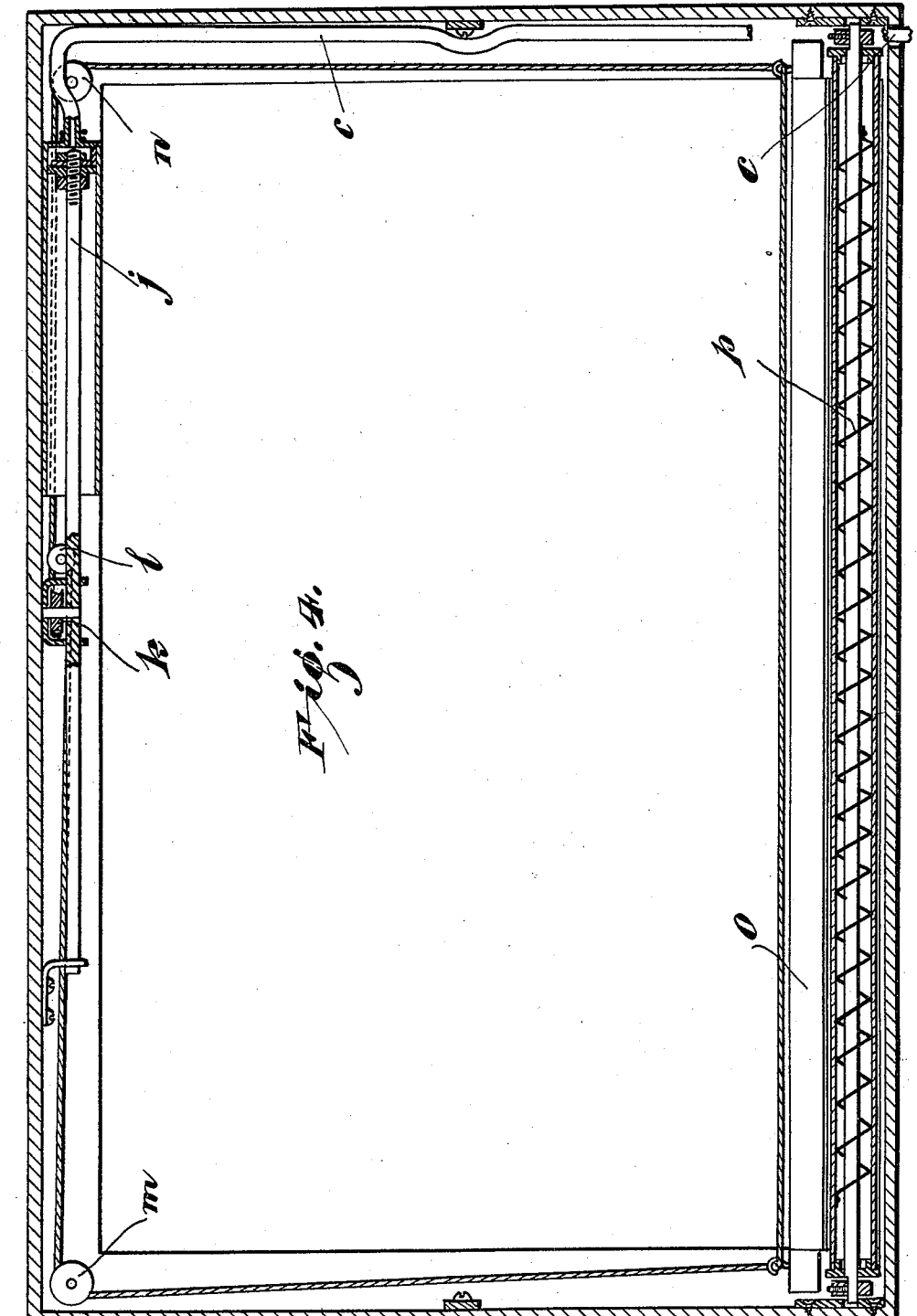

UNITED STATES PATENT OFFICE.

JOHN ALEXANDER KENNEDY-McGREGOR, OF BIRMINGHAM, ENGLAND.

DISPLAY APPARATUS.

1,179,531.     Specification of Letters Patent.     Patented Apr. 18, 1916.

Application filed May 12, 1913, Serial No. 767,101. Renewed February 29, 1916. Serial No. 81,289.

*To all whom it may concern:*

Be it known that I, JOHN ALEXANDER KENNEDY-McGREGOR, a subject of the Kingdom of Great Britain, residing at 74 Gravelly Hill, Birmingham, in the county of Warwick, England, engineer, have invented certain new and useful Improvements in or Relating to Display Apparatus, of which the following is a specification.

This invention comprises certain improvements in or relating to apparatus or mechanism for displaying advertisements or other indications.

According to the present invention, a display device bearing an advertisement or other indication is adapted to be displayed by any suitable source of power by the medium of a pneumatic connection.

This invention is particularly well adapted for an instance in which it is desired to display an advertisement blind over the window of a tube railway train, the blind being drawn over the window after the train has started and being caused to uncover the window before the train has stopped, the intention being to permit of the occupants inspecting the name of the station when the train is entering, but throughout the time during which the train is passing through the tunnel the advertisement is displayed over the place at which the window is provided. For this application of the invention to railway trains, I may control or regulate the operation of the blind by a governor worked from the wheels of the vehicle, while the blind is itself positively operated from power received from the wheels and not from the pull created by the centrifugal effort of the governor which centrifugal effort is only utilized for operatively connecting and disconnecting the source of power with the blind.

My present invention is carried out in its last-mentioned application by employing an air pump which is operated from the wheels of the vehicle. The pressure created by this air pump is conveyed by a conduit to a ram air pump placed in the vicinity of the blind. Means are provided in connection with said conduit whereby by opening a valve or the equivalent air can escape therefrom. Said means are operated or controlled by the governor. When the train is stationary or running slowly the governor has the effect of retaining the valve in the open position, but when the train attains the desired speed, the governor closes the valve or allows it to close thereby leaving the pump in proper communication with the latter for the operation of the blind.

A safety valve is provided so that after the blind has been operated the air compressed by the continued efforts of the pump can escape; the resistance offered by said safety valve must obviously be greater than that of the blind or all of the blinds operated by the pump.

Advantageously the governor operated valve itself constitutes the safety valve the arrangement being such that it can be opened either by the slow running or stopping of the governor or by the excessive pressure of the air.

In order that this invention may be clearly understood, and readily carried into practice, reference may be had to the appended explanatory three sheets of drawings, upon which:—

Figure 1 is a plan of one part of the apparatus according to the present invention. Fig. 2 illustrates the governor-controlled escape valve. Fig. 3 illustrates in section the safety valve. Fig. 4 is a front sectional elevation of the apparatus according to the present invention. Fig. 5 is a side sectional elevation of the apparatus according to the present invention.

In the drawings, $a$ illustrates the pump which is driven in any suitable manner from the wheels of the vehicle. The air from the pump $a$ is carried away by way of a conduit extending from the outlet $b$ with which the pump is in communication, and which conduit conveys the air to the blind to be hereinafter described, shown in Fig. 4, and in which figure the conduit in question is designated $c$. The air from one pump may for instance pass, to, say, eight different blinds, all of which are operated by the one pump. In connection with the pump a governor-controlled escape valve $d$ is provided which coöperates with the one end of the lever $e$. The other end of the valve lever $e$ is provided with a part $f$ operated by a centrifugal ball governor $g$ driven from the wheels and when the governor is stationary or only running slowly, the valve lever $e$ is retained in the position for leaving the valve $d$ open, this being by virtue of the spring $h$ of the governor $g$, but upon the speed increasing to the desired degree the valve $d$ closes by its spring $d^1$. As soon as the valve is closed, the air instead of escaping uselessly is thereby enabled to operate the rams to displace the blinds. After so displacing the blinds the increased pressure of air escapes by way of the safety valve $i$ which allows the air to so escape if it exceeds a certain pressure, such pressure being sufficient to retain all the blinds in the displaced position.

$q$ is a receptacle for containing compressed air and its capacity is about twice that of the entire pneumatic system to which the one pump relates. The said receptacle $q$ is in communication by a pipe $r$ with any suitable part of the system and the communicating pipe $r$ is controlled by an automatically operated cock or valve $s$. Provision is made whereby in operation the cock $s$ opens immediately after the valve $d$ has closed whereby the air contained in the reservoir is enabled to immediately operate the blinds with the advantage that the advertisements are displayed by a quicker movement than would be the case in the event of the operation being effected entirely by the pump. In the continued working of the pump the original pressure in the reservoir $q$ is restored before any air escapes at the safety valve $i$ and upon the train commencing to slow down the valve $s$ automatically closes immediately prior to the opening of the valve $d$ so that throughout the time during which the train is stationary the stored quantity of air is isolated within the receptacle $q$. As a convenient means of automatically operating the valve $s$, I may provide an integral extension $t$ on the lever $e$, the said extension $t$ being connected by a link $u$ with an arm provided on the rotatable plug of the cock $s$, the arrangement being such that the cock $s$ opens immediately after the closing of the valve $d$ and closes immediately before the opening of such valve $d$.

A ram $j$ to which the air is supplied is provided in conjunction with each blind, said ram consisting of a stationary cylinder having a moving piston or plunger furnished with a cup washer and adapted to be displaced by the pressure of the air. Said plunger is adapted to displace the blind through the medium of any suitable mechanism.

Both ends of a cord are secured to any suitable stationary part of the apparatus, after which both cords are passed through 180° around a pulley $k$ carried by the moving part of the ram $j$. After passing around the pulley $k$ the cords continue for a short distance together after which one cord is passed through 180° around a pulley $l$, after which the cords extend in a direction away from each other, one passing over the pulley $m$ and the other passing over the pulley $n$. It will be understood that the remaining part of the cord is in the form of a loop; this passes along the edge of the blind $o$ to be displaced and the cord can slip longitudinally in relation to such edge so that a compensating effect is obtained whereby both sides of the blind are pulled in substantially the same degree. $p$ is a spring which tends to retain the blind in its withdrawn position. A stop may be provided to limit the outward movement of the ram.

What I claim as my invention and desire to secure by Letters Patent is:—

1. In a device of the character described, the combination of a display device with a pneumatic system for operating said device, an escapement port in said system permitting the discharge of air therefrom to the atmosphere, and means for closing said port for causing the air in the system to operate said display device, an air reservoir, and means for automatically establishing communication between said system and said reservoir immediately after the system begins to operate said display device, substantially as described.

2. In a device of the character described, the combination of a display device with a pneumatic system for operating said device, an escape port in said system permitting the discharge of air therefrom into the atmosphere, means for closing said port adapted to cause the air in the system to operate said display device, an air reservoir, and means for automatically establishing communication between said system and reservoir immediately after the system begins to operate said display device, and means for closing said communication as soon as the discharge port is again opened to the atmosphere.

In witness whereof I have hereunto set my hand in the presence of two witnesses.

JOHN ALEXANDER KENNEDY-McGREGOR.

Witnesses:
ARTHUR H. BROWN,
ARCHIBALD F. LAMB.

Copies of this patent may be obtained for five cents each, by addressing the "Commissioner of Patents, Washington, D. C."